United States Patent [19]

Wanner

[11] Patent Number: 5,028,057
[45] Date of Patent: Jul. 2, 1991

[54] TOOL SHAFT FOR A TOOL OF THE PERCUSSIVE AND ROTATIVE TYPE

[75] Inventor: Karl Wanner, Leinfelden-Echterdingen, Fed. Rep. of Germany

[73] Assignee: Robert Bosch GmbH, Stuttgart, Fed. Rep. of Germany

[21] Appl. No.: 444,150
[22] PCT Filed: May 3, 1988
[86] PCT No.: PCT/DE88/00260
§ 371 Date: Nov. 20, 1989
§ 102(e) Date: Nov. 20, 1989
[87] PCT Pub. No.: WO88/09245
PCT Pub. Date: Dec. 1, 1988

[30] Foreign Application Priority Data
May 20, 1987 [DE] Fed. Rep. of Germany ....... 3716915

[51] Int. Cl.$^5$ .................. B23B 31/22; B23B 51/02
[52] U.S. Cl. .................... 279/19.3; 279/75; 408/16; 408/226
[58] Field of Search .................. 279/19–19.7, 279/1 TS, 75; 408/16, 226

[56]  References Cited
U.S. PATENT DOCUMENTS 4,107,949  8/1978  Wanner et al. ............... 279/1 B X
4,335,295  6/1982  Fowler ........................ 219/121 LM
4,943,192  7/1990  Lafforgue et al. ........... 279/19 X

FOREIGN PATENT DOCUMENTS 58281   11/1966  Australia .
285405  10/1970  Austria .
71821   2/1983   European Pat. Off. .
2405938 8/1975   Fed. Rep. of Germany .
2551125 5/1977   Fed. Rep. of Germany .
3443971 6/1986   Fed. Rep. of Germany .
2282323 3/1976   France .
2526978 11/1983  France .
2096045 10/1982  United Kingdom .

Primary Examiner—Steven C. Bishop
Attorney, Agent, or Firm—Michael J. Striker

[57]  ABSTRACT

A device on hand machine tools is suggested for the transmission of torque to percussion drilling tools in which at least two rotary driving grooves open out at the end of the tool shaft and strip-shaped rotary drivers of the tool shaft engage in these rotary driving grooves and include assigned flanks, which are at least approximately planar, and in which locking members are arranged in the tool receptacle and cooperate with two recesses in the tool shaft which are closed on both sides and lie diametrically opposite one another. In order to avoid incorrectly reversed insertion of tools with driving grooves which are worn out due to intensive wear, the latter are distributed along the circumference of the tool shaft in such a way that two rotary driving grooves can in no case lie diametrically opposite one another.

27 Claims, 3 Drawing Sheets

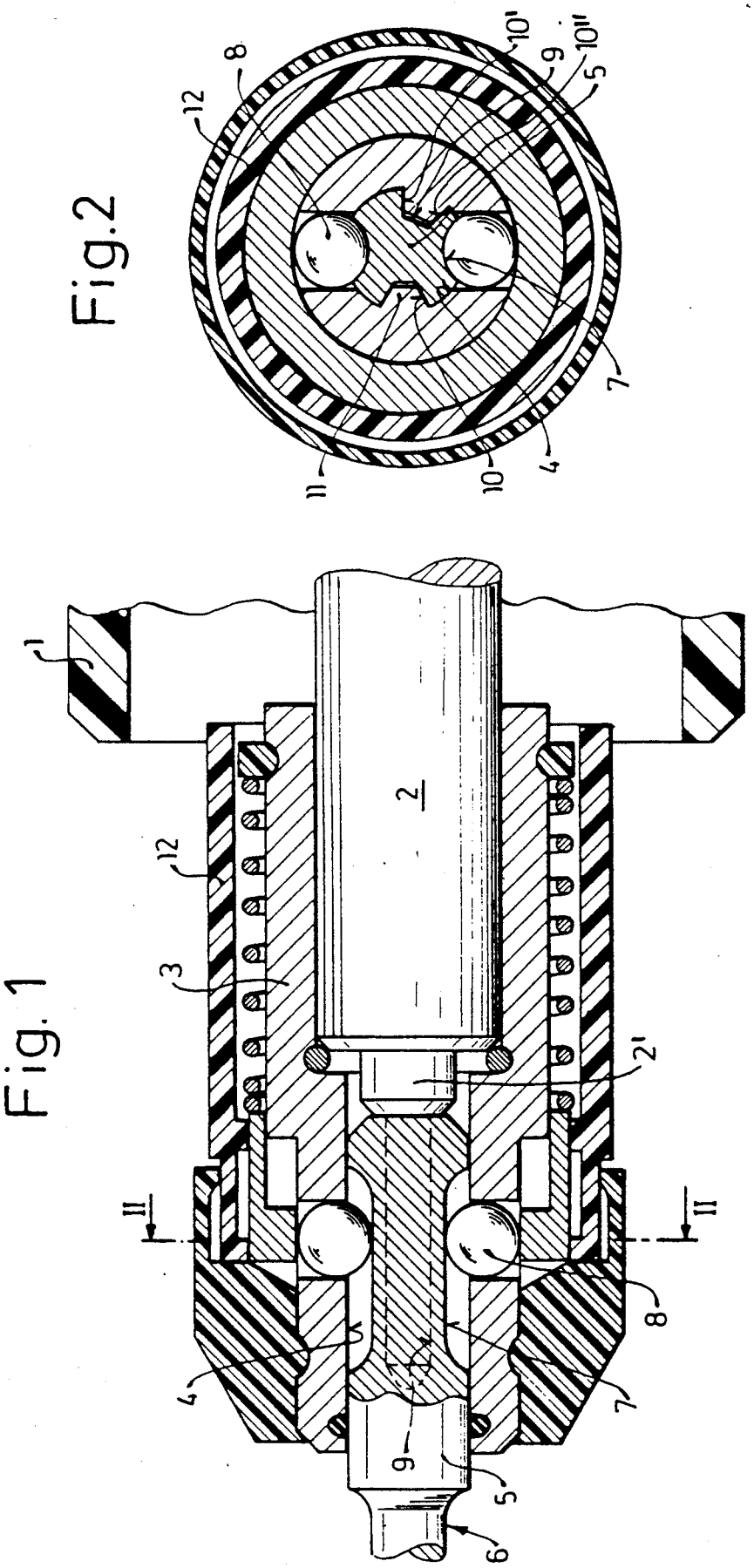

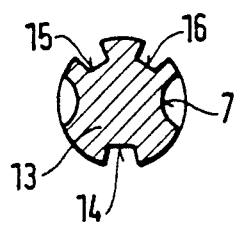
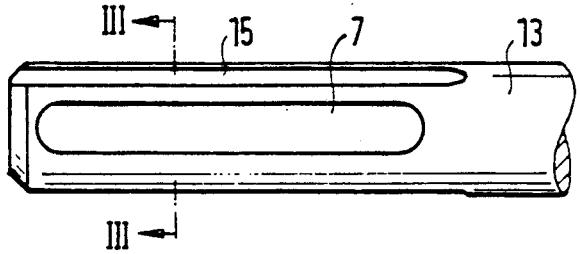
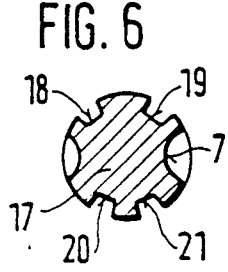
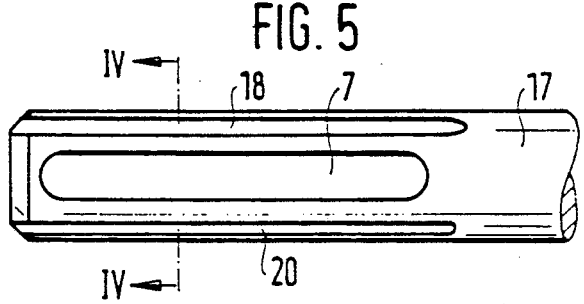
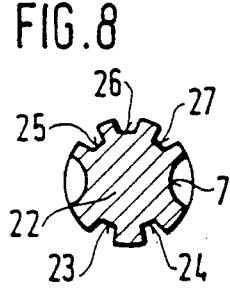
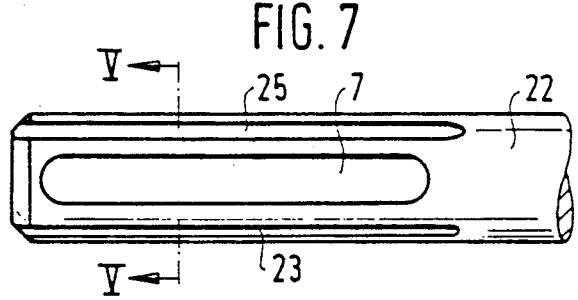
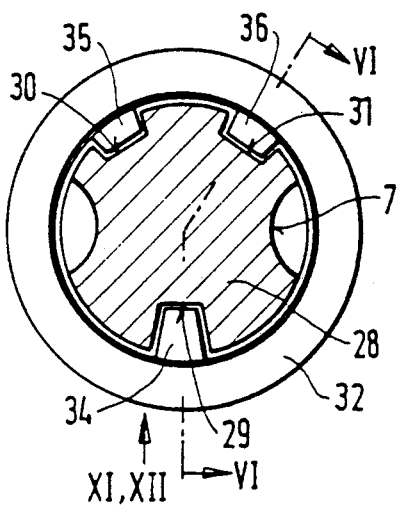
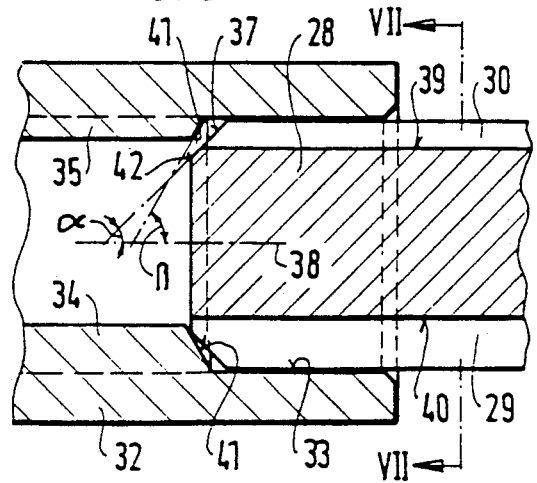

TOOL SHAFT FOR A TOOL OF THE PERCUSSIVE AND ROTATIVE TYPE

BACKGROUND OF THE INVENTION

The invention is related to a device on hand machine tools.

Such a device is already known from DE-PS 25 51 125. Tools constructed according to this patent are also usable in principle in tool receptacles provided according to AT-PS 285 405, wherein the locking elements applied in the latter engage in the recesses which are closed on both sides and arranged in the tool shaft outside the rotary driving grooves. The width and depth of the rotary driving grooves opening out at the end of the tool shaft are selected in such a way that they can not receive the locking elements, and accordingly the tool can not be incorrectly inserted.

However, particularly in severe construction site operation, the rotary driving grooves can become worn out after long use of the tool to such an extent that the tool can unintentionally be inserted into the tool holder in a position in which the locking elements engage in the rotary driving grooves. This brings about the risk that the machine may be unexpectedly disengaged from the tool when withdrawing the machine from the workpiece during operation, since the locking elements of the tool receptacle can slide out of the rotary driving grooves, which are open toward the end of the tool, in an unimpeded manner. This is particularly dangerous because when working with the machine the operator can not determine in certain cases that the tool is incorrectly inserted. In this case, the operator will only notice it—but in an entirely unanticipated manner—when he withdraws the machine from the workpiece and the tool, which is possibly stuck in the workpiece, remains in the latter. Since this separation of machine and tool is entirely unanticipated by the operator, there is the danger that he will lose his balance when working on a ladder or scaffold, which brings about a considerable risk of accident.

SUMMARY OF THE INVENTION

Accordingly, it is an object of the present invention to provide a tool of the above-described percussive and rotative type which is safer to operate than that currently available.

In keeping with this object and with others which will become apparent hereinafter, one feature of the present invention is that the rotary drivers of the tool receptacle assigned to the rotary driving grooves in the tool shaft are distributed around the circumference of the receptacle bore hole in such a way that two rotary drivers are never located diametrically opposite each other. The device according to the invention has the advantage that the tool can never be inserted in the tool holder in a position in which the locking elements arranged in the tool receptacle can engage in the rotary driving grooves opening out at the end of the tool shaft; this can be achieved without the necessity of applying additional locking means or the like.

It is particularly advantageous that a plurality of rotary driving grooves be arranged between the recesses which are closed on both sides, since the specific surface loading during the transmission of the driving torque is reduced as the number of rotary driving grooves increases, and the wear is accordingly decreased.

If one of the rotary driving grooves in the tool shaft is constructed so as to be deeper than the other rotary driving grooves and the respective strip-shaped rotary driver of the tool receptacle is constructed so as to be correspondingly higher, another advantageous step consists in providing a conical inserting bevel at the inserting end of the tool shaft, which inserting bevel encloses an angle $\alpha$ with the tool axis, and in providing the front sides of the strip-shaped rotary drivers at the tool side with inserting bevels which enclose an angle $\beta$ with the axis of the tool receptacle which is greater than the angle $\alpha$. If, in addition to this, the conical inserting bevel is dimensioned in such a way that it cuts into the bases of the shallower rotary driving grooves, while leaving the base of the deeper rotary driving groove untouched, this arrangement provides the advantage that when introducing the tool into the tool receptacle, a contact between the rotary driving strips and rotary driving grooves can only be effected if the tool has first been rotated relative to the tool receptacle until the highest rotary driver lies opposite the deepest rotary driving groove. Until then, however, the smooth, i.e. "untoothed" portion of the inserting bevel of the tool shaft slides along the inserting bevel at the highest strip-shaped rotary driver. Accordingly, the tool fits into the receptacle only in this position and the operator is not irritated by a catch-like engagement of the rotary driver in the shallower rotary driving grooves.

BRIEF DESCRIPTION OF THE DRAWING

Various embodiment examples of the invention are shown in the drawing and expalined in more detail in the following description.

FIG. 1 is a detailed longitudinal cross-sectional view of a tool holder arranged in a drill hammer with inserted tool;

FIG. 2 is a transverse cross-sectional view taken along section line II—II of FIG. 1;

FIG. 3 is a side view of a second embodiment of a tool shaft according to the present invention;

FIG. 4 is a cross-sectional view taken along section line III—III of FIG. 3;

FIG. 5 is a side view of a third embodiment of a tool shaft according to the present invention;

FIG. 6 is a cross-sectional view taken along section line IV—IV of FIG. 5;

FIG. 7 is a side view of a fourth embodiment of a tool shaft according to the present invention;

FIG. 8 is a transverse cross-sectional view taken along the section line V—V of FIG. 7;

FIG. 9 is a longitudinal cross-sectional view of a fifth embodiment of a tool shaft in connection with a tool holder taken along the section VI—VI of FIG. 10;

FIG. 10 is a cross-sectional view taken along VII—VII of FIG. 9;

DETAILED DESCRIPTION OF THE PREFERRED EMBODIMENTS

Figure 11:
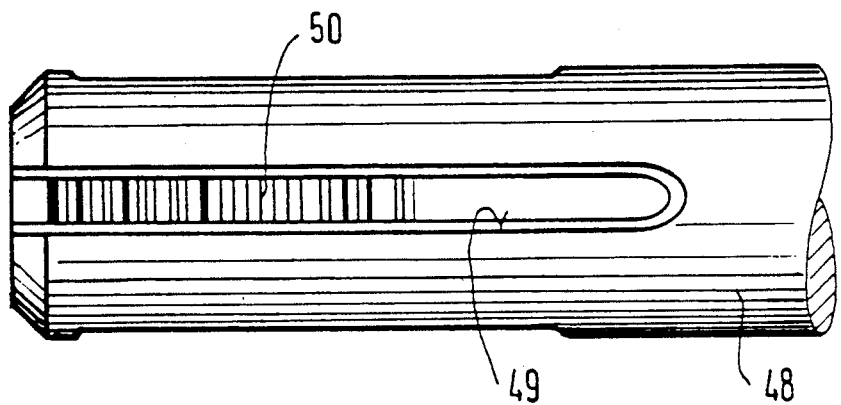
FIG. 11 is a plan view of a sixth embodiment of a tool shaft as seen in the direction XI of FIG. 10.

A tool spindle 2 extends out of the end of the housing of a drill hammer 1, which end is on the side of the workpiece and is only shown in part. The tool spindle 2 transmits a torque on the one hand and axial strokes, on the other hand, to a tool receptacle 3 which is securely connected with it. The tool shaft 5 of a drill 6 is inserted into the concentric receptacle bore hole 4 of the tool holder 3. Two recesses 7 which are closed in the axial direction at both sides are arranged at the tool shaft 5 so as to be located opposite one another on a diagonal line; assigned locking bodies 8 of the tool holder 3 are constructed as balls to engage in the recesses 7. As can be seen in FIG. 2, the slot- or groove-like recesses 7 have a circular-cylindrical cross-sectional shape. The locking bodies 8 can move out of the recesses 7 of the tool shaft 5 by means of axial displacement of a sleeve 12, so that the drill 6 can be removed from the tool holder 3. In addition to the recesses 7, rotary driving grooves 9 opening out at the end of the tool shaft 5 are arranged at the tool shaft 5. As can be seen in FIG. 2, the rotary driving grooves 9 are situated so as to be offset at different angles relative to the recesses 7. The rotary driving grooves 9 have two planar flanks 10 which extend at least approximately radially and cooperate with assigned surfaces of strip-shaped rotary drivers 11 which are arranged at the cylindrical inner wall of the receptacle bore hole 4 of the tool receptacle 3.

The rear end of the tool shaft contacts an anvil continuation 2' of the tool spindle 2 of the drill hammer, which anvil continuation 2' transmits the axial strokes. The front portion of the drill 6 located in the front of the tool shaft 5 is constructed in a conventional manner, a view of the latter being omitted in the drawing for this reason. A portion of the drill 6 which contains a conveying spiral for carrying away drillings knocked loose from the drilling head adjoins a drillings head comprising carbide cutting edges.

As can be seen from FIG. 2, one of the rotary driving grooves 9 is angularly offset by approximately 90° relative to the recesses 7, while the other rotary driving groove is angularly offset in an assymmetrical manner relative to the recesses 7. It is advisable for reasons of stability to arrange the rotary groove 9 in such a way that the flank 10' transmitting the torque during operation is farther from the recess 7 adjacent to it than the flank 10'' is from the recess adjacent to it.

During rotation of the tool spindle 2, the torque is transmitted to the tool shaft 5 of the drill 6 via the rotary drivers 11 engaging in the rotary driving grooves 9. Very favorable conditions result from the planar flanks 10, which extend at least approximately radially, and the assigned surfaces of the strip-shaped rotary drivers 11, since the forces to be transmitted are approximately normal on the cooperating surfaces. The force transmission always occurs—even in the state of advanced wear—at surfaces and not ultimately at the edges of the recesses. The recess 7 arranged in the tool shaft 5 serve only for the axial locking of the drill shaft in the tool receptacle 3. The stress and accordingly also the wear on the locking bodies 8, which are constructed as balls, is very sharply reduced by means of this.

A second embodiment of the tool shaft designated here by 13 is shown in FIGS. 3 and 4 of the drawing. Recesses 7 which correspond to the recesses 7 of the first embodiment (FIGS. 1 and 2) are again arranged at the tool shaft 13. With reference to the circumference of the tool shaft 13, one rotary driving groove 14 is arranged between the two recesses 7 on one side and two rotary driving grooves 15, 16 are arranged on the other side.

FIGS. 5 and 6 show an embodiment which is distinguished from that according to FIGS. 3 and 4 in that in the first case two rotary driving grooves 18, 19; 20, 21 are arranged between the recesses 7 in the tool shaft 17.

FIGS. 7 and 8 show an embodiment in which two (23, 24) driver grooves are arranged in the tool shaft 22 between the recesses 7 on one side and three (25, 26, 27) driver grooves are arranged between the recesses 7 on the other side in the tool shaft 22.

The advantage of the arrangement according to FIGS. 3 to 8 consists in that the specific surface loading during the transmission of the driving moment is smaller the more driving grooves are present. The wear is also smaller to this extent.

When using a plurality of grooves in the tool shaft, it may happen that, when the tool shaft is inserted into the tool holder and the correct drill position is sought by means of rotating to both sides, the front side of the tool shaft and the front sides of the opposite rotary drivers slide along one another in the manner of a catch until the correct inserting position is found. This not only impedes handling when inserting a tool into the tool receptacle, but is also irritating for the operator. A remedy is provided for this by means of an embodiment form shown in FIGS. 9 and 10.

As can be seen from FIG. 9, the tool shaft 28 comprises rotary driving grooves of different depths. In the shown embodiment, a rotary driving groove 29 having a greater depth is located opposite two rotary driving grooves 30, 31 of shallower depth. Strip-shaped rotary drivers 34, 35, 36 are arranged at the cylindrical inner wall of the receiving bore hole 33 of the tool receptacle 32. The rotary driver 34 projecting farther forward is intended for cooperation with the rotary driving groove 29, the rotary drivers 35, 36 which project forward less far engage in the rotary driving grooves 30, 31. The tool shaft 28 has a conical inserting bevel 37 at its front side. The latter encloses an angle $\alpha$ with the tool axis 38. The bevel 37 is dimensioned in such a way that it cuts into the bases 39 of the rotary driving grooves 30, 31, while leaving the base 40 of the rotary driving groove 29 untouched. The rotary drivers 34, 35 and 36 are provided with inserting bevels 41 at their front sides on the tool side, which inserting bevels 41 enclose an angle $\beta$ with the axis of the tool receptacle 32 coinciding with the axis 38. After the insertion of a tool shaft 28 in the receiving bore hole 33 of the tool receptacle 32, the rotary driving grooves 29, 30, 31 will generally not meet exactly on the respective rotary drivers 34, 35, 36. Rather, it is necessary to rotate the tool shaft 28 in the receiving bore hole around the axis 38 until the rotary driving grooves and the rotary drivers are located opposite one another so as to fit in with one another and the tool can be completely inserted into the tool receptacle. Until this point, the tool shaft 28 is supported against the inserting bevel 41 of the rotary driver 34 with the edge 42 formed by its front side in connection with the spherical outer surface area of the inserting bevel 37. During the rotation of the tool, the edge 42 moves smoothly along the inserting bevel 41 in a sliding manner until the rotary driving groove 29 is located opposite the rotary driver 34 and the rotary driving grooves 30, 31 are located opposite the rotary drivers 35, 36 and the tool shaft can be completely inserted into the tool receptacle.

Figure 12:
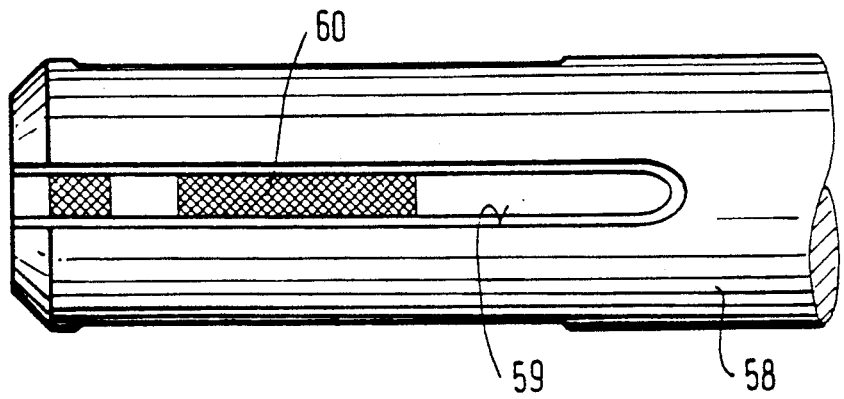
FIG. 12 is a plan view of a seventh embodiment of a tool shaft as seen in the direction of arrow XII of FIG. 10.

Two additional embodiments of a tool shaft constructed according to the invention are shown in FIGS. 11 and 12. A coding which contains the tool-dependent data is arranged at the base of the rotary driving grooves 49, 50 opening out at the end of the tool shaft 48, 58 (compare XI, XII in FIG. 10). This data can refer to the type of tool—drill or chisel—, the tool dimensions—drill diameter—or the material of the tool—drill comprising heavy-duty tool steel or drill with carbide plating.

In the embodiment according to FIG. 11, the coding consists of a bar code which is painted on. In the embodiment shown in FIG. 12, the coding is formed by means of areas which are formed in the shape of stripes and comprise different surface roughness at the base of the rotary driving groove 59. This surface roughness can be produced on the one hand by means of chemical abrasion processes or can also be produced mechanically, e.g. in the manner of file cutting.

In addition to these two examples, it is also possible to achieve the coding by means of other geometric differences, e.g. different widths of the rotary driving grooves.

The coding is read by mechanical or electrical sensors, known per se, and converted into a mechanical or electrical signal which switches corresponding mechanical or electrical couplings, or is fed, as an electrical signal, to the electronic control unit of the hand machine tool. The selection of determined rates of rotation, striking speeds, individual striking energy, response time of the safety clutch, turning off the drill drive or the striking mechanism, slow starting or changes of other machine parameters can be achieved by means of this.

The arrangement of the coding constitutes an advisable feature of the tools, according to the invention, since the rotary driving groove carrying the coding or the recess carrying the coding, which recess is closed on both sides, can always be inserted into the assigned tool receptacle in the same angular position only when using shafts of tools which are constructed according to the invention. This is necessary in order to be effective if the mechanical or electrical sensor for reading the coding in the tool receptacle is to be used.

It will be understood that each of the elements described above, or two or more together, may also find a useful application in other types of constructions differing from the types described above.

While the invention has been illustrated and described as embodied in a tool shaft for a tool of the percussive and rotative type, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a device on a hand machine tool for transmitting torque to a percussion and drilling tool having a tool shaft with an end engaged in a tool receptacle of said hand machine tool, in which at least two rotary driving grooves which open out at said end of said tool shaft and in which a plurality of strip-shaped rotary drivers of said tool receptacle engage in said rotary driving grooves and have respective assigned flanks, which are at least approximately planar, and in which at least one locking body is located in said tool receptacle and cooperate with two recesses in said tool shaft which are closed on both ends and are located diametrically opposite one another, said tool receptacle having a receptacle bore hole, the improvement wherein said rotary drivers assigned to said rotary driving grooves in said tool shaft are distributed around said receptacle bore hole circumferentially in such a way that two rotary drivers are never located diametrically opposite one another.

2. The improvement as defined in claim 1, wherein at least one of said rotary driving grooves and at least one of said rotary drivers are located between said recesses.

3. The improvement as defined in claim 1, wherein said rotary driving grooves and said rotary drivers are located in substantially one and the same axial area on said tool shaft, respectively, as said recesses and said locking bodies.

4. In a tool, especially for percussion operation; drilling operation and percussion and drilling operation, for insertion into a bore hole of a tool receptacle of a percussion tool, a drilling tool, or a percussion and drilling tool, having at least two rotary driving grooves which open out at an end of a tool shaft inserted in said bore hole, said tool receptacle having a plurality of strip-shaped rotary drivers engaged in said rotary driving grooves provided with respective assigned flanks, which are at least approximately planar, and at least one locking body located in said tool receptacle, said bore hole having a wall and a bore hole axis, said strip-shaped rotary drivers extending parallel to said bore hole axis and are located on said wall of said bore hole, the improvement wherein said tool shaft has two recesses which are closed at both ends and located diametrically opposite one another, and at least one of said rotary driving grooves is located between said recesses which are closed at both ends, said drivers having surfaces which cooperate with said flanks of said rotary driving grooves, at least two of said flanks of said rotary driving grooves being circumferentially offset relative to said recesses by different angular distances.

5. The improvement as defined in claim 4, wherein at least one of said rotary driving grooves has a coding which contains tool-dependent information.

6. The improvement as defined in claim 5, wherein said coding comprises a shape parameter.

7. The improvement as defined in claim 6, wherein said shape parameter is a width of said rotary driving groove.

8. The improvement as defined in claim 6, wherein said shape parameter is a width and depth of said rotary driving groove.

9. The improvement as defined in claim 6, wherein said shape parameter is made from knurls, chamfers, grooves or other surface shapes.

10. The improvement as defined in claim 4, wherein at least one of said recesses has a coding which contains tool-dependent information.

11. The improvement as defined in claim 10, wherein said coding comprises a shape parameter.

12. The improvement as defined in claim 11, wherein said shape parameter is a width of said rotary driving groove.

13. The improvement as defined in claim 11, wherein said shape parameter is a width and depth of said rotary driving groove.

14. The improvement as defined in claim 11, wherein said shape parameter is made from knurls, chamfers, grooves or other surface shapes.

15. The improvement as defined in claim 5, wherein said coding comprises a bar code.

16. The improvement as defined in claim 15, wherein said bar code is a painted bar code.

17. The improvement as defined in claim 10, wherein said coding comprises a bar code.

18. The improvement as defined in claim 17, wherein said bar code is a painted bar code.

19. In a device on a hand machine tool for transmitting torque to a percussion tool, a drilling tool, or a percussion and drilling tool having a tool shaft with an end engaged in a tool receptacle of said hand machine tool, in which at least two rotary driving grooves which open out at said end of said tool shaft and in which a plurality of strip-shaped rotary drivers of said tool receptacle engage in said rotary driving grooves and have respective assigned flanks, which are at least approximately planar, and in which at least one locking body is located in said tool receptacle and cooperate with two recesses in said tool shaft which are closed on both ends and are located diametrically opposite one another, said tool receptacle having a receptacle bore hole, the improvement wherein said rotary drivers assigned to said rotary driving grooves in said tool shaft are distributed around said receptacle bore hole circumferentially in such a way that two rotary drivers are never located diametrically opposite one another, at least one of said rotary driving grooves and at least one of said rotary drivers being located between said recesses which are closed at both of said ends, the number of said rotary driving grooves located between said two recesses on one side of said tool shaft being greater than the number of said rotary driving grooves located on the other side of said tool shaft.

20. In a device on a hand machine tool for transmitting torque to a percussion tool, a drilling tool, or a percussion and drilling tool having a tool shaft with an end engaged in a tool receptacle of said hand machine tool, in which at least two rotary driving grooves which open out at said end of said tool shaft and in which a plurality of strip-shaped rotary drivers of said tool receptacle engage in said rotary driving grooves and have respective assigned flanks, which are at least approximately planar, and in which at least one locking body is located in said tool receptacle and cooperate with two recesses in said tool shaft which are closed on both ends and are located diametrically opposite one another, said tool receptacle having a receptacle bore hole, the improvement wherein said rotary drivers assigned to said rotary driving grooves in said tool shaft are distributed around said receptacle bore hole circumferentially in such a way that two rotary drivers are never located diametrically opposite one another, each of said rotary driving grooves in said tool shaft having a different width from that of another of said rotary driving grooves and each of said rotary drivers having a different width from that of another of said rotary drivers.

21. In a device on a hand machine tool for transmitting torque to a percussion tool, a drilling tool, or a percussion and drilling tool having a tool shaft with an end engaged in a tool receptacle of said hand machine tool, in which at least two rotary driving grooves which open out at said end of said tool shaft and in which a plurality of strip-shaped rotary drivers of said tool receptacle engage in said rotary driving grooves and have respective assigned flanks, which are at least approximately planar, and in which at least one locking body is located in said tool receptacle and cooperate with two recesses in said tool shaft which are closed on both ends and are located diametrically opposite one another, said tool receptacle having a receptacle bore hole, the improvement wherein said rotary drivers assigned to said rotary driving grooves in said tool shaft are distributed around said receptacle bore hole circumferentially in such a way that two rotary drivers are never located diametrically opposite one another, each of said rotary driving grooves in said tool shaft having a different depth from that of another of said rotary driving grooves and each of said rotary drivers having a different depth from that of another of said rotary drivers.

22. In a device on a hand machine tool for transmitting torque to a percussion tool, a drilling tool, or a percussion and drilling tool having a tool shaft with an end engaged in a tool receptacle of said hand machine tool, in which at least two rotary driving grooves which open out at said end of said tool shaft and in which a plurality of strip-shaped rotary drivers of said tool receptacle engage in said rotary driving grooves and have respective assigned flanks, which are at least approximately planar, and in which at least one locking body is located in said tool receptacle and cooperate with two recesses in said tool shaft which are closed on both ends and are located diametrically opposite one another, said tool receptacle having a receptacle bore hole, the improvement wherein said rotary drives assigned to said rotary driving grooves in said tool shaft are distributed around said receptacle bore hole circumferentially in such a way that two rotary drivers are never located diametrically opposite one another, one of said rotary driving grooves in said tool shaft being deeper than the other ones of said rotary driving grooves and having a deeper groove bottom while said other rotary driving grooves have shallower groove bottoms and the respective strip-shaped rotary driver of said tool receptacle being constructed so as to be correspondingly higher than the other of said rotary drivers.

23. The improvement as defined in claim 22, wherein said tool shaft has an inserting end and a tool axis and said inserting end has a conical inserting bevel which forms an angle $\alpha$ with said tool axis, said strip-shaped rotary drivers having facing ends directed toward said conical inserting bevel, said facing ends of said strip-shaped rotary drivers having inserting bevels which form an angle $\beta$ with a longitudinal axis of said tool receptacle running in the same direction as said tool axis of said tool shaft, said angle $\beta$ being greater than said angle $\alpha$, and said conical inserting bevel being dimensioned in such a way that said conical inserting bevel engages said shallower groove bottoms while leaving said deeper groove bottoms untouched.

24. In a tool, especially for percussion operation, drilling operation and percussion and drilling operation for insertion into a bore hole of a tool receptacle of a percussion tool, a drilling tool, or a percussion and drilling tool, having at least two rotary driving grooves which open out at an end of a tool shaft inserted in said bore hole, said tool receptacle having a plurality of strip-shaped rotary drivers engaged in said rotary driving grooves provided with respective assigned flanks, which are at least approximately planar, and at least one locking body located in said tool receptacle, said bore hole having a wall and a bore hole axis, said strip-shaped rotary drivers extending parallel to said bore hole axis and are located on said wall of said bore hole, the improvement wherein said tool shaft has two recesses which are closed at both ends and located diametrically opposite one another, and at least one of said rotary driving grooves is located between said recesses which are closed at both ends, said drivers having surfaces which cooperate with said flanks of said rotary driving grooves, at least two of said flanks of said rotary driving grooves being circumferentially offset relative to said recesses by different angular distances, at least one of said rotary driving grooves for at least one of said rotary drivers being located between said recesses which are closed at both of said ends, the number of said rotary driving grooves located between said two recesses on one side of said tool shaft being greater than the number of said rotary driving grooves located on the other side of said tool shaft.

25. In a tool, especially for percussion operation, drilling operation and percussion and drilling operation for insertion into a bore hole of a tool receptacle of a percussion tool, a drilling tool, or a percussion and drilling tool, having at least two rotary driving grooves which open out at an end of a tool shaft inserted in said bore hole, said tool receptacle having a plurality of strip-shaped rotary drivers engaged in said rotary driving grooves provided with respective assigned flanks, which are at least approximately planar, and at least one locking body located in said tool receptacle, said bore hole having a wall and a bore hole axis, said strip-shaped rotary drivers extending parallel to said bore hole axis and are located on said wall of said bore hole, the improvement wherein said tool shaft has two recesses which are closed at both ends and located diametrically opposite one another, and at least one of said rotary driving grooves is located between said recesses which are closed at both ends, said drivers having surfaces which cooperate with said flanks of said rotary driving grooves, at least two of said flanks of said rotary driving grooves being circumferentially offset relative to said recesses by different angular distances, and at least one of said rotary driving grooves is located between said recesses which are closed at both ends, said rotary driving grooves being distributed circumferentially around said tool shaft so that one of said rotary driving grooves is never diametrically opposite another of said rotary driving grooves, each of said rotary driving grooves in said tool shaft having a different width from that of another of said rotary driving grooves.

26. In a tool, especially for percussion operation, drilling operation and percussion and drilling operation for insertion into a bore hole of a tool receptacle of a percussion tool, a drilling tool, or a percussion and drilling tool, having at least two rotary driving grooves which open out at an end of a tool shaft inserted in said bore hole, said tool receptacle having a plurality of strip-shaped rotary drivers engaged in said rotary driving grooves provided with respective assigned flanks, which are at least approximately planar, and at least one locking body located in said tool receptacle, said bore hole having a wall and a bore hole axis, said strip-shaped rotary drivers extending parallel to said bore hole axis and are located on said wall of said bore hole, the improvement wherein said tool shaft has two recesses which are closed at both ends and located diametrically opposite one another, and at least one of said rotary driving grooves is located between said recesses which are closed at both ends, said drivers having surfaces which cooperate with said flanks of said rotary driving grooves, at least two of said flanks of said rotary driving grooves being circumferentially offset relative to said recesses by different angular distances, and at least one of said rotary driving grooves is located between said recesses which are closed at both ends, said rotary driving grooves being distributed circumferentially around said tool shaft so that one of said rotary driving grooves is never diametrically opposite another of said rotary driving grooves, each of said rotary driving grooves in said tool shaft having a different depth from that of another of said rotary driving grooves.

27. In a tool, especially for percussion operation, drilling operation and percussion and drilling operation, for insertion into a bore hole of a tool receptacle of a percussion tool, a drilling tool, or a percussion and drilling tool, having at least two rotary driving grooves which open out at an end of a tool shaft inserted in said bore hole, said tool receptacle having a plurality of strip-shaped rotary drivers engaged in said rotary driving grooves provided with respective assigned flanks, which are at least approximately planar, and at least one locking body located in said tool receptacle, said bore hole having a wall and a bore hole axis, said strip-shaped rotary drivers extending parallel to said bore hole axis and are located on said wall of said bore hole, the improvement wherein said tool shaft has two recesses which are closed at both ends and located diametrically opposite one another, and at least one of said rotary driving grooves is located between said recesses which are closed at both ends, said drivers having surfaces which cooperate with said flanks of said rotary driving grooves, at least two of said flanks of said rotary driving grooves being circumferentially offset relative to said recesses by different angular distances, and at least one of said rotary driving grooves is located between said recesses which are closed at both ends, said rotary driving grooves being distributed circumferentially around said tool shaft so that one of said rotary driving grooves is never diametrically opposite another of said rotary driving grooves, one of said rotary driving grooves in said tool shaft being deeper than the other ones of said rotary driving grooves and having a deeper groove bottom while said other rotary driving grooves have shallower groove bottoms.

* * * * *